United States Patent [19]
Ault et al.

[11] Patent Number: 4,472,712
[45] Date of Patent: Sep. 18, 1984

[54] MULTIPOINT DATA COMMUNICATION SYSTEM WITH LOCAL ARBITRATION

[75] Inventors: Cyrus F. Ault, Wheaton; Kristin F. Kocan, Chicago, both of Ill.

[73] Assignee: AT&T Bell Laboratories, Murray Hill, N.J.

[21] Appl. No.: 355,258

[22] Filed: Mar. 5, 1982

[51] Int. Cl.³ .............................. H04Q 9/00; H04J 6/00
[52] U.S. Cl. ................................... 340/825.5; 370/85; 370/92
[58] Field of Search .......... 340/825.5, 825.08, 825.13; 370/94, 96; 364/200

[56] References Cited

U.S. PATENT DOCUMENTS

| | | | |
|---|---|---|---|
| 3,755,782 | 8/1973 | Haas et al. | 340/147 |
| 4,030,075 | 6/1977 | Barlow | 340/172.5 |
| 4,040,014 | 8/1977 | Gehrking | 340/147 |
| 4,045,774 | 8/1977 | Morrison | 340/147 |
| 4,063,220 | 12/1977 | Metcalfe et al. | 340/147 |
| 4,128,883 | 12/1978 | Duke et al. | 364/200 |
| 4,130,865 | 12/1978 | Heart et al. | 364/200 |
| 4,161,786 | 7/1979 | Hopkins et al. | 364/900 |
| 4,228,496 | 10/1980 | Katzman et al. | 364/200 |
| 4,234,952 | 11/1980 | Gable et al. | 370/94 |
| 4,244,018 | 1/1981 | Mui | 364/200 |
| 4,245,344 | 1/1981 | Richter | 371/68 |
| 4,262,357 | 4/1981 | Shima | 340/825.5 |
| 4,276,643 | 6/1981 | Laprie et al. | 371/8 |
| 4,292,623 | 9/1981 | Eswaran et al. | 340/147 |
| 4,320,467 | 3/1982 | Glass | 340/825.5 |
| 4,347,498 | 8/1982 | Lee et al. | 370/60 |
| 4,360,912 | 11/1982 | Metz et al. | 370/96 |
| 4,380,761 | 4/1983 | Boggs | 340/825.5 |
| 4,412,326 | 10/1983 | Limb | 340/825.5 |

*Primary Examiner*—Donald J. Yusko
*Attorney, Agent, or Firm*—D. Volejnick; P. Visserman

[57] ABSTRACT

A multipoint access data communication system which includes a communication bus, a plurality of transceivers connected to the bus for communication, and a remote collision detector associated with each transceiver for detecting collisions between communications on the medium, has improvements which adapt the transceivers for connection to a plurality of network interface units, and local access arbitrators associated with the transceivers for preventing collisions between transmissions simultaneously attempted by two or more network interface units connected to a transceiver.

36 Claims, 8 Drawing Figures

MULTIPOINT DATA COMMUNICATION SYSTEM WITH LOCAL ARBITRATION

CROSS-REFERENCE TO RELATED APPLICATION

The present application is related to an application for U.S. letters patent by W. Thelen, entitled "Improved Multipoint Data Communication System with Local Collision Detection," which is being filed on the same day as this application and which is assigned to the same assignee. Both applications disclose in part the same matter but individually claim different inventive concepts.

TECHNICAL FIELD

This invention relates to data communication systems, and more particularly to multipoint access data communication systems with collision detection.

BACKGROUND OF THE INVENTION

Large scale computer systems typically have a number of component parts such as processors, storage devices, and input/output units, and data is regularly transferred among them during the execution of system tasks. In distributed processing systems which generally employ several cooperating processors to perform system tasks, the problem of communications among the various units of the system can become very complex.

As distributed processing systems become widely used, attention is being given to standardizing the data communication systems which provide communications between the various parts that make up the distributed processing system. One type of communication system which has gained wide acceptance is the carrier sense multiple access—carrier detect (CSMA—CD) type of system, exemplified by the Ethernet ®, a multipoint access data communication system with collision detection, which is substantially described in Metcalfe et al., U.S. Pat. No. 4,063,220.

The data communication system described by Metcalfe et al. comprises a bit-serial receiver-transmitter network which provides a communication path for a plurality of using devices, such as processors, storage devices, and input/output units, that are connected to it. The network is centered around a communication medium, such as a coaxial cable, to which a plurality of transceivers are tied for communicating with each other across the medium. A plurality of corresponding using devices are connected to the plurality of transceivers by means of associated network interface stages. Each transceiver and interface stage combination constantly senses the data stream passing through the network, the interface stage constantly looking for data packets addressed to it, that is, to its associated using unit.

In addition to providing normal transmitting and receiving functions, the transceiver provides further control functions, utilized for aborting a transmission of data packets from the interface stage, when it senses a collision on the medium—herein referred to as a remote collision—of data transmitted by the associated and another interface stage. Also, the associated interface stage blocks its transmission of data when it senses the presence of other data on the medium.

While being advantageous from the standpoint of simplicity and versatility, conventional Ethernet—type data communication systems suffer from certain disadvantages that limit their application and usefulness. In such systems, each using device is connected to the communication medium at a separate tap via a dedicated transceiver and interface stage combination. Because of the deterioration of the medium's electrical characteristics caused by taps on the medium, the number of taps, and hence the number of using devices that can be connected to the medium, has been limited. Also, the use of a separate dedicated transceiver with each using device has made addition of using devices to the system costly. But, inter alia because of the way in which collision detection is accomplished in such systems—for example through a bit-by-bit comparison of signals transmitted and signals simultaneously detected by a transceiver on the medium—it has been thought that the use of a single transceiver to service more than one using device would radically alter the communication protocol as seen by the using devices.

There is another major limiting factor on the number of using units that can be connected to such a network: the loss of network throughput due to conflicting requests for the network communication medium. An increasing number of using units connected to the network increase the contention for the medium and make collisions between transmissions attempted on the medium increasingly common. Because collisions result in aborted transmissions, the increasing occurrence of collisions increasingly degrades the throughput of the network and results in an increasing loss of operating speed of the using devices. After a limited number of using units has been connected to a given network, its performance on the average is degraded to a point where it cannot practically support any further using units.

SUMMARY OF THE INVENTION

It is these and other disadvantages of the prior data communication systems that the present invention is directed to solve.

According to this invention, a data communication system includes a communication medium, a plurality of transceiver means connected to the medium, means for adapting at least one transceiver means to be concurrently interfaced with a plurality of using means, remote collision detection means associated with each transceiver means, and means associated with each of the at least one transceiver means for preventing local collisions, which are collisions between communications from a plurality of using means interfaced to that transceiver means.

Preferably, using means are interfaced to the transceiver means by a plurality of interface means which are connected to the plurality of transceiver means, the at least one transceiver means is adapted for concurrent connection to plurality of the interface means, and the local collision prevention means comprise means for preventing collisions between communications from a plurality of the interface means connected to that transceiver means.

Preferably the local collision prevention means comprise means for preventing contemporaneous communications from a plurality of the using means, or from a plurality of the interface means, to the transceiver means. Preferably the local collision prevention means comprise means for arbitrating communications access from the plurality of the using means, or from a plurality of the interface means, to the transceiver means.

The above-described improvements to the data communication system have numerous advantages.

Enabling a plurality of using devices to share a single transceiver in common reduces the number of transceivers and associated hardware that must be used in the system, thereby providing a significant improvement in the cost of the system. The reduction in the number of transceivers used decreases the number of taps on the communication medium and therefore improves the electrical characteristics of the medium. Alternatively, the maximum number of using devices that can be connected to the communication medium without deteriorating medium electrical characteristics below a usable minimum is increased, because no longer does each device require a separate tap.

Because the connection to, or disconnection from, a transceiver of one or more using devices does not affect the electrical characteristics of the communication medium to which the transceiver is connected, in-service changes of the system at any transceiver location can be readily made.

Furthermore, by preventing local collisions from occurring, the maximum number of using devices that can be connected to the communication medium without deteriorating system performance characteristics, such as throughput of the medium, below a usable minimum is increased, because the using units that are connected to a single transceiver appear to the medium substantially as a single using unit from a collision viewpoint.

These and other advantages of this invention will become apparent during the following description of an illustrative embodiment of the invention taken together with the drawing.

DETAILED DESCRIPTION

The illustrative embodiment of the present invention is an improvement to the Ethernet-type communication system disclosed in Metcalfe et al., U.S. Pat. No. 4,063,220. The disclosure of that patent is incorporated herein by reference.

Figure 1:
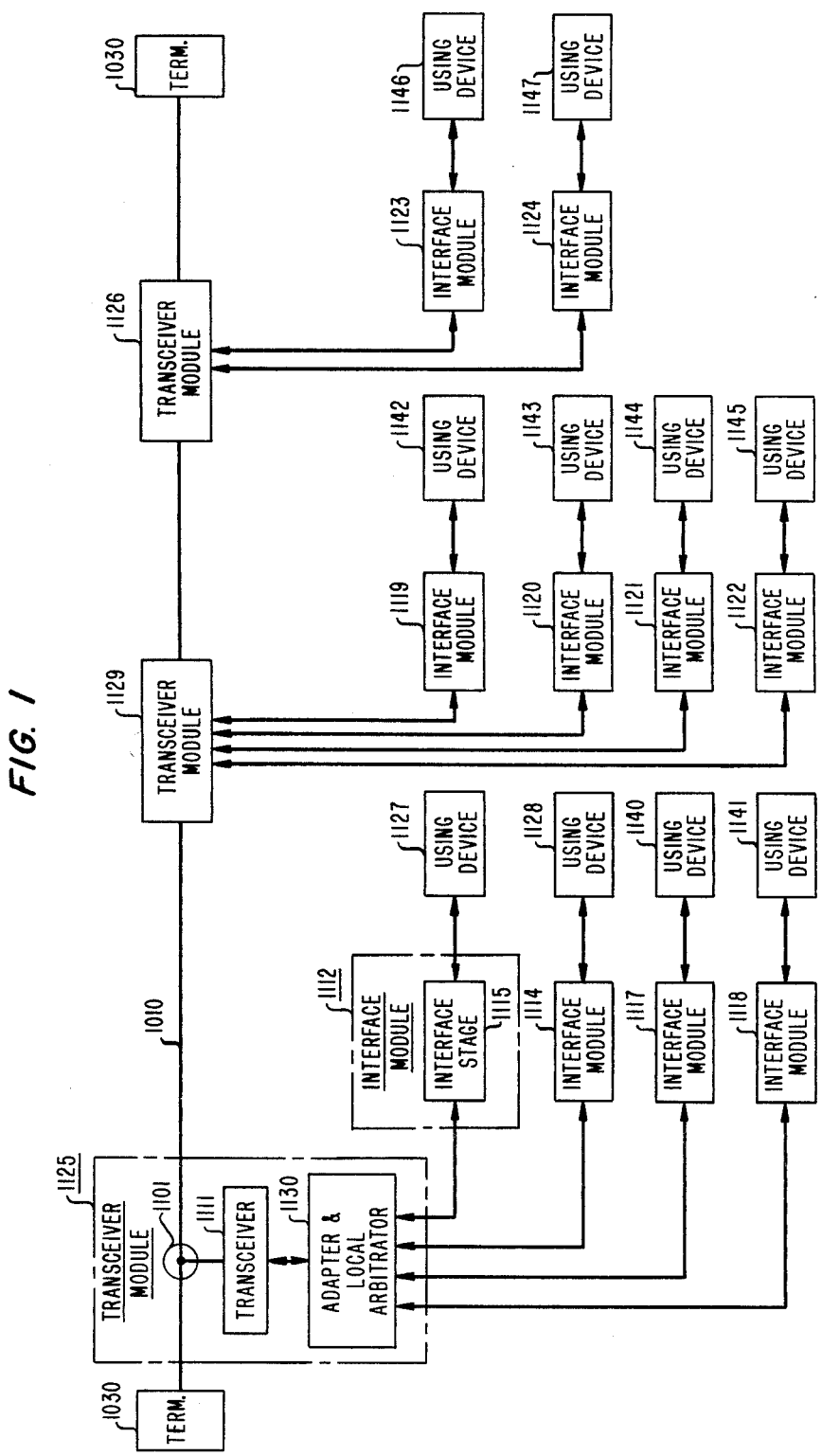
FIG. 1 is a block diagram of an illustrative communication system constructed according to the present invention.

Referring now to the drawing, FIG. 1 shows a block diagram of the illustrative communication system constructed according to the present invention.

The communication system is centered around a bus 1010 which serves as a communication medium of the system. The bus 1010 comprises a coaxial cable. The bus 1010 substantially corresponds to the bus 10 of Metcalfe et al. Each end of the bus 1010 is terminated in a terminator 1030. The terminators 1030 are akin to the terminators 30 of Metcalfe et al. Distributed along the bus 1010 are a plurality of transceiver modules 1129, 1125, 1126.

In the example of FIG. 1, each transceiver module is adapted for connection to four interface modules, though it need not be connected to as many as four. Thus the transceiver module 1125 is shown connected to four interface modules 1112, 1114, 1117, and 1118; the transceiver module 1129 is shown connected to four interface modules 1119, 1120, 1121, and 1122; and the transceiver module 1126 is shown connected to only two interface modules 1123 and 1124.

A using device is in turn connected to each of the interface modules: device 1127 to the module 1112, device 1128 to the module 1114, device 1140 to the module 1117, device 1141 to the module 1118, device 1142 to the module 1119, device 1143 to the module 1120, device 1144 to the module 1121, device 1145 to the module 1122, device 1146 to the module 1123, and device 1147 to the module 1124.

A using device can be any device desired to be connected to the data communication system for communication. For example, it can be a data processor, an I/O terminal, a mass storage device, or an external data communication link.

The system configuration shown in FIG. 1 can be varied at will: using devices and their associated network interface modules can be added to or deleted from the system to reconfigure it, and additional transceiver modules may be added to the system to increase its capacity.

The communication system shown in FIG. 1 can also be interconnected, through repeaters (not shown) to another similar communication system (not shown). Also, another bus, substantially duplicative of the bus 1010 and having its own transceiver modules, can be added to the system, and the interface modules can be connected to the transceiver modules on the second bus as well, to provide the system with an active—standby or a duplex communication medium.

Figure 2:
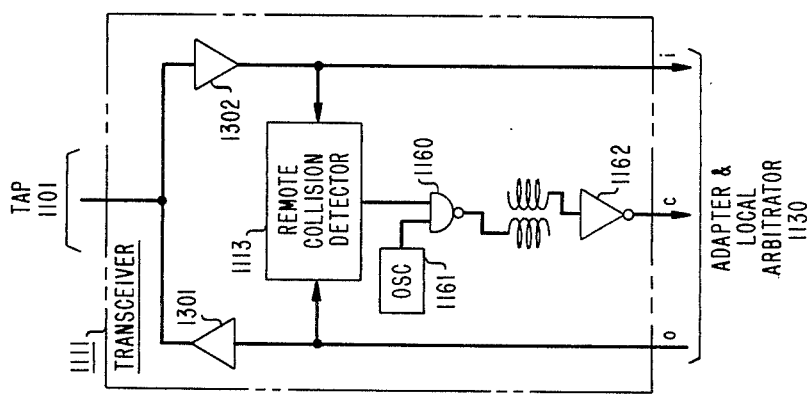
FIG. 2 is a logic diagram of an embodiment of a transceiver block of FIG. 1.

All of the transceiver modules of FIG. 1 are substantially identical. Representative of them is the transceiver module 1125, which includes a tap 1101, a transceiver 1111, and an adapter and local arbitrator 1130. The transceiver 1111 is substantially like the transceiver 111 of Metcalfe et al., and includes a transmitter 1301, a receiver 1302, and a remote collision detector 1113, as shown in FIG. 2. These elements of the transceiver 1111 are AC-coupled to the system circuitry (see FIG. 5 of Metcalfe et al.) to provide ground isolation for the bus 1010 from the system circuitry. The transceiver 1111 is connected for communications to the bus 1010 by the tap 1101, which is substantially like the tap 101 of Metcalfe et al. The adapter and local arbitrator 1130 is connected to the transceiver 1111 and adapts it for concurrent connection to a plurality of interface modules 1112, 1114, 1117, 1118. The adapter and local arbitrator 1130 is discussed in more detail below in conjunction with FIGS. 4–8.

Figure 3:
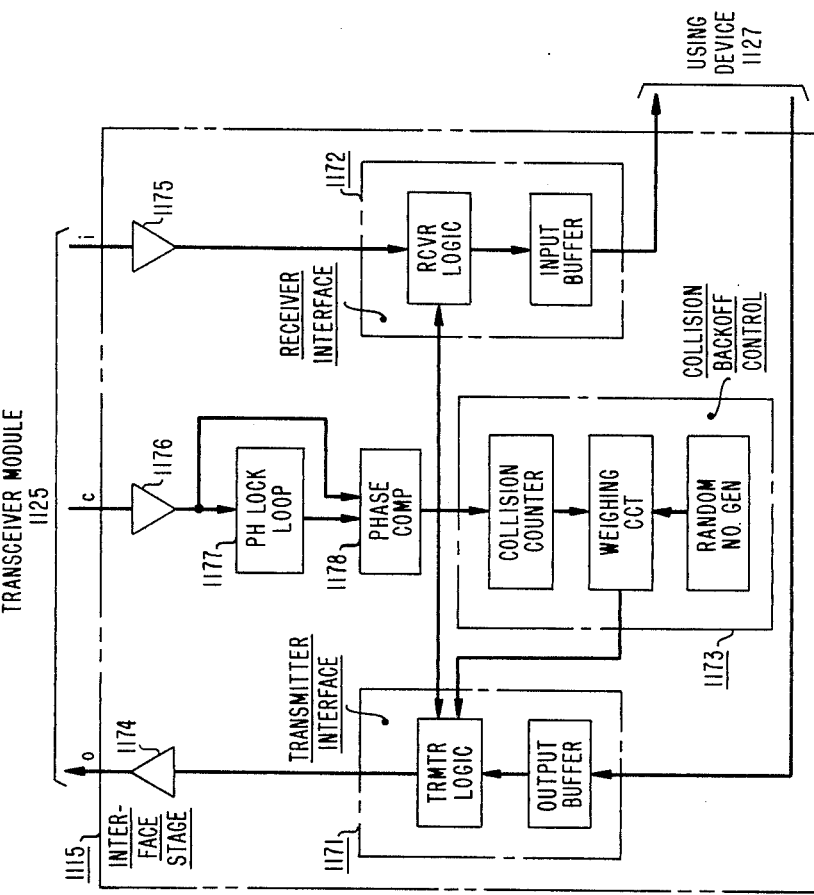
FIG. 3 is a logic diagram of a first embodiment of an interface stage block of FIG. 1.
Figure 6:
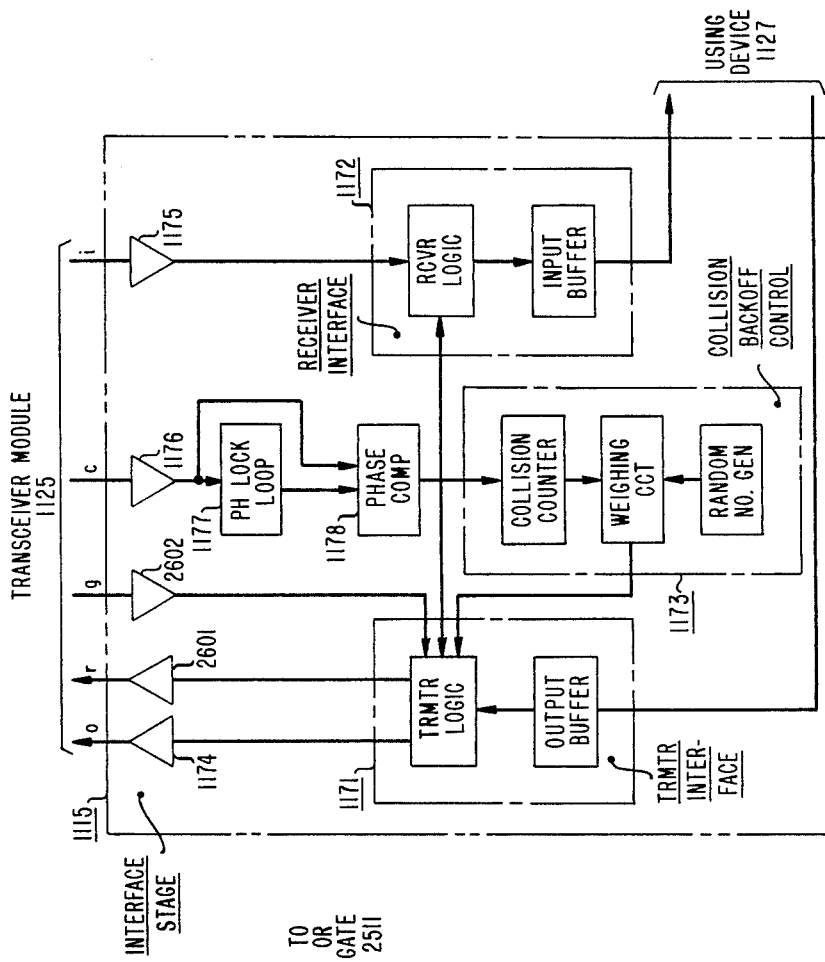
FIG. 6 is a logic diagram of a second embodiment of an interface stage block of FIG. 1.

All of the interface modules are also substantially the same. Their function is to interface the using devices to the transceiver modules for communication; therefore, their organization depends in part upon the type of using device they are interfacing. As shown in FIG. 1, the interface module 1112, taken as representative of all the interface modules, includes an interface stage 1115. The interface stage 1115 is substantially like the interface stage 115 or 116 of Metcalfe et al., and includes a transmitter interface 1171, a receiver interface 1172, and a collision backoff control 1173, as shown in FIGS. 3 and 6. For an interface stage akin to the stage 116 of Metcalfe et al, the collision backoff control 1173 is merely a straight-through connection.

The interface stage 1115 has connected to it the using device 1127. It is in turn connected for communications to the transceiver module 1125. Thus the interface stage 1115 interfaces the device 1127 to the transceiver module 1125 for communications on the bus 1010. The other using devices are similarly interfaced for communications by their interface modules.

Figure 4:
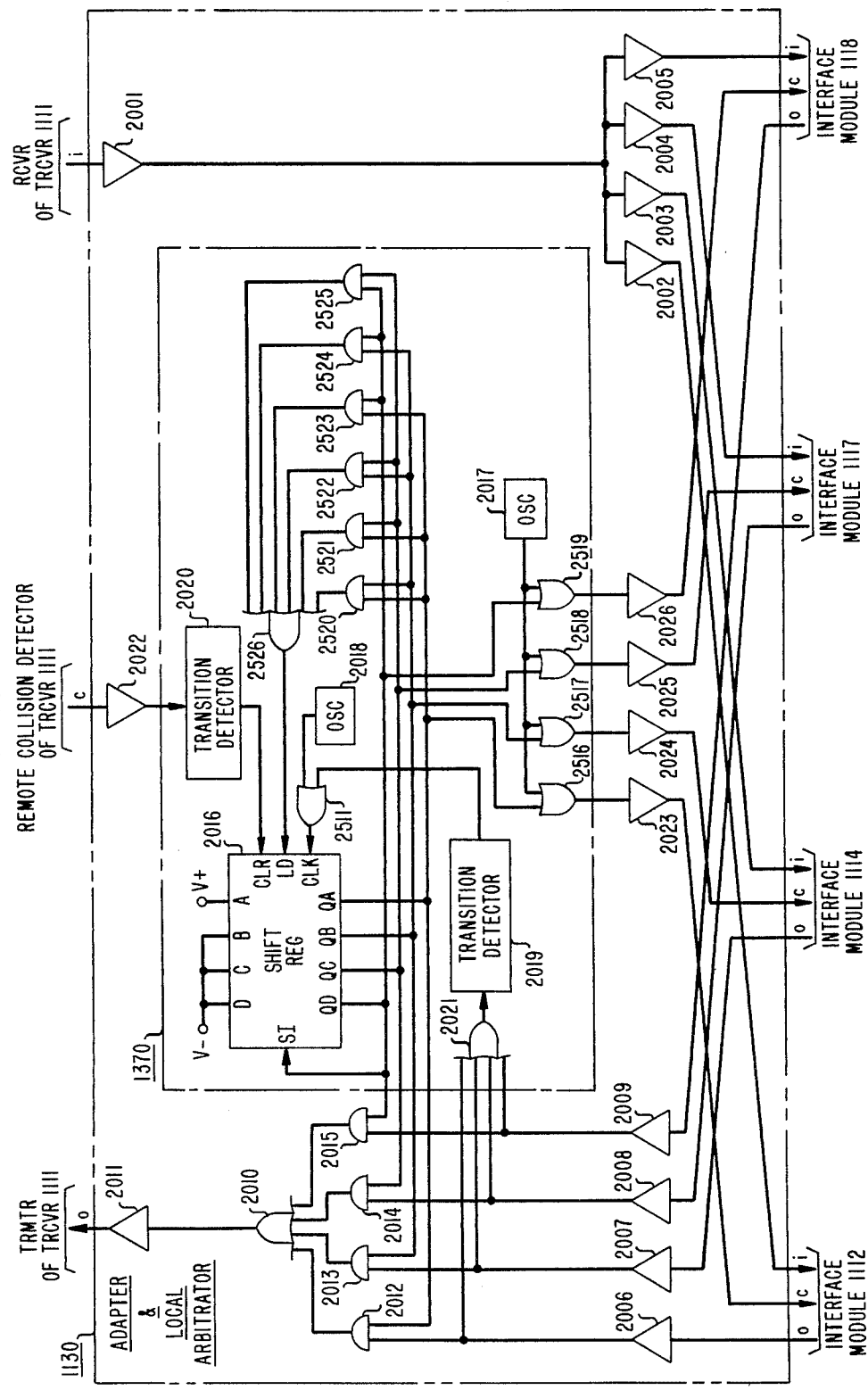
FIG. 4 is a circuit diagram of a first embodiment of an adapter and local arbitrator block of FIG. 1.

Turning now to FIG. 4, there is shown a circuit diagram of a first embodiment of the adapter and local arbitrator 1130 of the transceiver module 1125. The adapter and local arbitrator 1130 is representative of the adapter and local arbitrators of the other transceiver modules and therefore only the one adapter and local arbitrator will be discussed.

The adapter and local arbitrator 1130 adapts the transceiver 1111 for concurrent connection to the plurality of the interface modules 1112, 1114, 1117, 1118, by fanning out the transceiver's inputs and outputs to the plurality of outputs and inputs of those interface modules. The adapter and local arbitrator 1130 also prevents local collisions from occurring. Local collisions are communications, transmissions, attempted contemporaneously by a plurality of the interface units which are connected to the same transceiver. The adapter and local arbitrator 1130 is connected to the "i", "o", and "c" lines of the transceiver 1111 (see FIG. 2), and to the "o", "i", and "c" lines of the interface module 1112 (see FIG. 3) and the interface modules 1114, 1117, and 1118 (see FIG. 1). All of these lines, and other lines discussed hereafter, are preferably twisted pairs of insulated wire.

The line "i" which leads from the output of the receiver 1302 (see FIG. 2) is terminated at the input of a line receiver 2001. The line receiver 2001, as well as other line receivers and line drivers referred to below, are standard commercially available units, such as the device 10116 manufactured by Motorola, Inc. of Phoenix, Ariz. The line receiver 2001 regenerates signals present on the "i" line and uses the regenerated signals to drive the inputs of line drivers 2002, 2003, 2004, and 2005. The output of each of the line drivers 2002, 2003, 2004, and 2005 in turn drives the "i" line of one of the interface modules 1112, 1114, 1117, and 1118, respectively. The output of the receiver of any other transceiver module is similarly fanned out to each of the interface modules connected to that transceiver module.

The lines "o" from the four interface modules 1112, 1114, 1117, and 1118 are terminated in the inputs of line receivers 2006, 2007, 2008, and 2009, respectively. The output of each line receiver 2006, 2007, 2008, and 2009 is connected to the input of one of four conventional AND gates 2012-2015, respectively. A second input of each gate 2012-2015 is connected to an output from the local arbitrator 1370. The outputs of the gates 2012-2015 are in turn connected to the inputs of a conventional "OR" circuit 2010 which combines their outputs onto a single lead that forms the input to a line driver 2011. The output of the line driver 2011 is connected to the line "o" which leads to the input of the transmitter 1301 (see FIG. 2). The input to the transmitter of any other transceiver module is similarly fanned out to each of the interface modules connected to that transceiver module.

Referring to FIG. 2, the line "c", which leads to the remote collision detector 1113 is not connected directly to the remote collision detector's output. The reason is that the output signal of the remote collision detector 1113 is a direct current signal (see Metcalfe et al.) which is not particularly suited for transmission over the distances between the transceiver module 1125 and the interface module 1112 that interconnections via twisted pairs permit. The DC output signal of the remote collision detector 1113 is therefore converted into a digital signal. The output of the remote collision detector 1113 is input into a "NAND" gate 1160 along with the output of an oscillator 1161 which preferably has a frequency of 10 MHz. The output of the gate 1160 is AC-coupled to the input of a line driver 1162, whose inverted output is connected to the line "c". The result is that no signals appear on the line "c" when the output of the remote collision detector 1113 is low, but signals of the oscillator 1161 frequency are sent on the line "c" when the output of the remote collision detector 1113 is high.

In systems where the output of the remote collision detector is a digital signal, the additional gate 1160 and oscillator 1161 are not utilized. Instead, the output of the remote collision detector is AC-coupled directly to the line driver 1162, and the line driver's standard, non-inverted, output is connected to the line "c".

Returning again to FIG. 4, the line "c" from the transceiver 1125 is terminated in the input of a line receiver 2022. The output of the line receiver 2022 is connected to the local arbitrator 1370, where it functions as a preemptive control signal for the states of four outputs of the local arbitrator 1370. These four outputs are connected through line drivers 2023-2026 to the "c" lines of the interface modules 1112, 1114, 1117 and 1118, respectively. By means of this scheme the output of a remote collision detector of any transceiver module is fanned out to each of the interface modules connected to that transceiver module.

Referring to FIGS. 3 and 6, at the interface stage 1115 the line "c" connects to the input of a line receiver 1176. The output of the line receiver 1176 is not connected directly to the input of the collision backoff control 1173, however. The reason is that the line "c" carries fluctuating digital signals, as explained below, while the collision backoff control 1173 operates from a DC level (see Metcalfe et al.). The fluctuating digital signals carried by the line "c" are therefore converted into a DC level before connection to the input of the collision backoff control 1173. The output of the line receiver 1176 is connected to the input of a conventional phase-locked loop 1177, which operates at the same frequency as the oscillator 1161, and to one input of a conventional phase comparator 1178. The output of the phase-locked loop 1177 is connected to another input of the phase comparator 1178, whose output is connected to the input of the collision backoff control 1173.

The phase-locked loop 1177 continuously generates an output signal at its operating frequency. The phase comparator 1178 compares this signal with signals present at the output of the line receiver 1176 for a match. When no signals are present at the output of the line receiver 1176, there is not match and the phase comparator 1178 generates no output signal. When a signal of the phase-locked loop's operating frequency appears at the output of the line receiver 1176, the phase-locked loop 1177 locks onto this signal and synchronizes its output signal therewith. The phase comparator 1178 detects a match and generates an output DC signal for as long as the match continues to exist.

In a system where the interface stages are adapted to operate from digital collision detect signals, the additional phase-locked loop 1177 and phase comparator 1178 are eliminated, and the output of the line receiver 1176 is connected directly to the input of the collision backoff control 1173.

Each set of the three lines "i", "o", and "c" from the adapter and local arbitrator 1130 of the transceiver module 1125 connects to one of the interface modules 1112, 1114, 1117, and 1118. Should fewer than four interface modules be connected to the transceiver module 1125, as is the case for the transceiver module 1126, the "i", "o", and "c" lines intended for the absent interface modules are simply left unused.

Returning now to FIG. 4, the local arbitrator 1370 comprises a simple polling circuit which sequentially, in a round-robin fashion, enables one of the interface modules 1112, 1114, 1117, and 1118 to transmit to the associated transceiver 1111. As only one of the interface modules 1112, 1114, 1117, and 1118 is enabled at any one time to transmit, local collisions cannot occur.

To disable the interface modules from transmitting, the local arbitrator 1370 generates a "collision detected" signal which is continuously sends to the interface modules over their "c" lines. To enable a selected interface module to transmit for a period of time the arbitrator 1370 ceases to send the "collision detected" signal to that interface module for that period of time.

The local arbitrator 1370 includes a conventional four-bit shift register 2016. One input A of four loading inputs A–D of the register 2016 is connected to a voltage source V+, such as a +5VDC line. The other loading inputs B–D are connected to a voltage source V−, such as a ground lead. This connection scheme causes the shift register to be loaded with three zeros and a one.

The shift register 2016 has four outputs QA-QD at which appear the contents of the shift register 2016. The shift register contents are shifted by one position for each pulse appearing at the CLK input of the shift register 2016. When the shift register 2016 is initially loaded with the values appearing at its inputs D-A, its contents are 0001, and these signal values appear at the outputs QD-QA, respectively. Following the first CLK input pulse, the contents of the register 2016 are shifted by one, so that the values appearing at the outputs QD-QA are 0010, respectively. After two more CLK input pulses, the state of the QD-QA outputs is 1000. The QD output is connected to the SI input of the shift register 2016, which returns the QD output state to the first bit of the register 2016. Therefore, following the next CLK input pulse, the QD-QA outputs of the register 2016 change state from 1000 to 0001. The process of shifting the 1 through the shift register is then repeated.

The CLK input signals are supplied to the shift register 2016 by an oscillator 2018 which operates at some predetermined frequency, preferably at 1 MHz. The output of the oscillator 2018 is connected to an input of an OR gate 2511 whose output is connected to the CLK input of the register 2016.

A second input of the gate 2511 selectively disables the oscillator 2018 output from reaching the register 2016. The second input of the gate 2511 is connected to the output of a transition decoder 2019, whose input is connected to the output of an OR gate 2021. The inputs of the OR gate 2021 are tapped onto the outputs of the line drivers 2006-2009.

The transition detector 2019 monitors the output of the gate 2021 for signal level transitions. It outputs a high signal level when it senses transitions. Its output is low when it senses no changes in the output level of the gate 2021.

Figure 5:
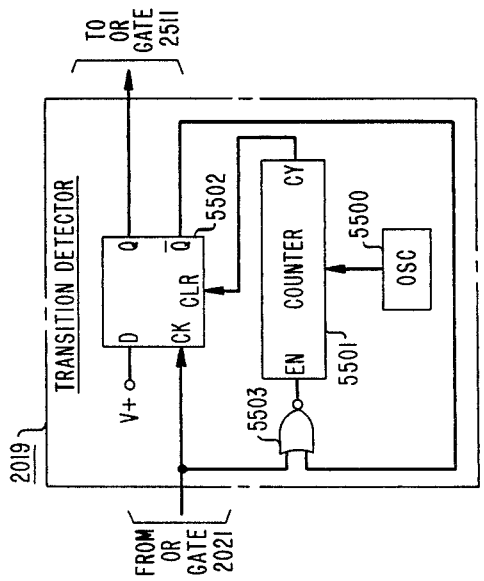
FIG. 5 is a circuit diagram of a transition detector of FIG. 4.

Any suitable transition detector may be utilized. One embodiment of a suitable transition detector 2019 is shown in FIG. 5. The transition detector 2019 includes a conventional D flip-flop 5502. The D input of the flip-flop 5502 is connected to a voltage source V+, for example a +5VDC line. The CLK input of the flip-flop 5502 is connected to the output of the gate 2021. The Q output of the flip-flop 5502 is connected to one input of the gate 2511, and its $\bar{Q}$ output is connected to an input of a NOR gate 5503. A second input of the gate 5503 is connected to the output of the gate 2021. The output of the gate 5503 is connected to the enable (EN) control input of a conventional counter 5501. The counting input of the counter 5501 is connected to an oscillator 5500, which operates at a preselected frequency, for example at 32 MHz. The carry (CY) output of the counter 5501 is connected to the clear (CLR) input of the flip-flop 5502.

Initially, the output of the gate 2021 is low, so the CLK input of the flip-flop 5502 is low. The Q output of the flip-flop 5502 to the gate 2511 is also low, the flip-flop 5502 previously having been cleared. Hence the $\bar{Q}$ output of the flip-flop 5502 is high. This causes the EN input of the counter 5501 to be low, and the counter 5501 is disabled and reset. Thus the CY output of the counter 5501 to the CLR input of the flip-flop 5502 is low.

When the output of the gate 2021 goes high, the CLK input of the flip-flop 5502 goes high, and causes the Q output to go high and the $\bar{Q}$ output to go low. The EN input of the counter 5501 remains low, and so the counter 5501 remains disabled.

When the output of the gate 2021 goes low again, the CLK input of the flip-flop 5502 goes low. This has no effect on the state of the Q and $\bar{Q}$ outputs of the flip-flop 5502. But the two low inputs to the NOR gate 5503 cause a high level signal to appear at the EN input of the counter 5501. The counter 5501 is enabled and begins to count the output pulses of the oscillator 5500.

The oscillator 5500 and counter 5501 are matched such that the counter 5501 times the maximum interval during which signals being transmitted from an interface module to the transceiver may have a low signal level. This time, of course, depends upon the signal encoding format and the transition frequency. An interval longer than the above-defined interval is interpreted as an indication that signal transmissions have ceased.

Thus, if the output of the gate 2021 goes high again within the above-described interval, the EN input of the counter 5501 goes low and the counter 5501 is disabled and reset without having generated a high output level at CY. Thus the state of the flip-flop 5502 is not changed, and its Q output continues to be high.

If, however, the output of the gate 2021 does not go high within that above-described interval, the counter 5501 counts to its maximum and generates a high signal at its CY output. This causes a high signal to appear at the CLR input of the flip-flop 5502, resetting its Q output low and its $\bar{Q}$ output high. The high $\bar{Q}$ output disables and resets the counter 5501.

Thus, whenever an interface module 1112, 1114, 1117, or 1118 is transmitting to the transceiver 1111, the transmitted signal level changes are sensed at the output of the gate 2021 by the transition detector 2019, which responds by generating a high level at its output. This high output masks the clock signals of the oscillator 2018 at the OR gate 2511, causing a steady high signal to reach the CLK input of the shift register 2016, thereby disabling the shift register 2016 from shifting for as long as transmitted signal level transitions continue to be sensed at the outputs of one of the line drivers 2006-2009.

Should some error result in more than one of the outputs QA-QD simultaneously being set to 1, a feedback circuit comprised of AND gates 2520-2526 causes the shift register 2016 to reload with the 0001 value of its inputs D-A. The AND gates 2520-2525 test outputs QA-QD to determine if any pair of them is simultaneously set to one. The outputs QD and QC are input to the gate 2525, the outputs QB and QD are input to the gate 2524, the outputs QA and QD are input to the gate 2523, the outputs QB and QC are input to the gate 2522, the outputs QA and QC are input to the gate 2521, and the outputs QA and QB are input to the gate 2520. The input of the gates 2520-2525 are input to the OR gate 2526 whose output is connected to the LD input of the shift register 2016. A high signal appearing at the output of any one or more of the gates 2520-2525 causes a high signal to appear at the LD input of the register 2016, which causes the values of the inputs D-A to be reloaded into the register 2016.

The output of the shift register 2016 is cleared—its outputs QA-QD are all set to 0—by a high signal appearing at the CLR input of the register 2016. The CLR input is connected to the output of a transition detector 2020, whose input is connected to the output of the line driver 2022. As the input of the line driver 2022 is connected to the "c" line from the transceiver 1111, the transition detector 2020 monitors the "remote collision detected" signals.

The transition detector 2020 is substantially the same as the transition detector 2019 of FIG. 5. It monitors the output of the line driver 2022 for signal level transmissions, and outputs a high signal when it senses transitions. Its output is low when it senses no changes in the output level of the line driver 2022. Thus whenever a "remote collision detected" signal appears at the output of the line driver 2022, the transition detector 2020 causes the shift register 2016 to output all zeros at QA-QD, and to keep outputting all zeros until the "remote collision detected" signal ceases to appear.

Each of the outputs QA-QD of the shift register 2016 also forms an input to one of four OR gates 2516-2519, respectively. A second input of the gates 2516-2519 is formed by the output of an oscillator 2017, which operates at the same frequency as the oscillator 1161 of FIG. 2. The outputs of the gates 2516-2519 are connected to inputs of the line drivers 2023-2026, respectively, whose outputs drive the "c" lines leading to the interface modules 1112, 1114, 1117, and 1118, respectively.

Furthermore, the outputs QA-QD form the local arbitrator 1370 inputs to the AND gates 2012-2015, respectively.

The operation of the adapter and local arbitrator 1130 of FIG. 4 is as follows. Assuming initial contents of the shift register 2016 of the local arbitrator 1370 to be 0001, and no remote collision being detected at the transceiver 1111, the outputs QB-QD of the shift register 2016 are low, or zero, and the output QA is high, or one. Because only the one output QA is high, the outputs of the gates 2520-2525 are low, the output of the gate 2526 is low, and thus the LD input to the shift register 2016 is low.

Because the QB-QD inputs to the gates 2516-2519, respectively, are low, the output signals of the oscillator 2017 are not being masked at those gates, but are being sent to the interface modules 1114, 1117, and 1118 on the "c" lines as "collision detected" signals. At those interface modules (see FIG. 3) the "collision detected" signals are conventionally processed (see Metcalfe et al.) and cause those interface modules to be disabled from transmitting on the "o" lines to the transceiver module 1125.

Not only are the interface modules 1114, 1117, and 1118 disabled from transmitting, but their outputs are disconnected from the gate 2010 by the gates 2013-2015. The gates 2013-2015 are disabled by the low state of the QB-QD outputs, respectively, of the shift register 2016. This scheme provides additional protection against the occurrence of local collisions and prevents unauthorized transmissions, such as by a babbling interface module, from interfering with other transmissions or from tying up the system.

Because the QA input to the gate 2516 is high, the output signals of the oscillator 2017 are masked at that gate and the "c" line to the interface module 1112 is held at steady high level. Hence no "collision detected" digital signals are sensed at the interface stage 1115 (see FIG. 3) of the interface module 1112, and that interface module is not disabled from transmitting to the transceiver module 1125.

If the interface module 1112 is not ready to transmit or if it senses activity on its "i" lead (see Metcalfe et al.) for the duration of the time period allotted to it by the oscillator 2018, it remains quiescent. When the allotted time period runs out, the oscillator 2018 outputs a pulse to the CLK input of the shift register 2016.

If the interface module 1112 has data to transmit and does not sense any activity on its "i" lead (see Metcalfe et al.) during the allotted time period, it transmits the data, properly encoded preferably in Manchester format (see Metcalfe et al.), on the "o" lead. The transmission passes to the adapter and local arbitrator 1130 (see FIG. 4) and enters the AND gate 2012. The gate 2012 is enabled by the high state of the QA output of the shift register 2016, and the transmission passes through the gate 2012 to the gate 2010, and therethrough onto the "o" lead of the transceiver 1111.

The signals comprising the transmission are tapped at the output of the line receiver 2006 and input through the gate 2021 to the transition detector 2019. The detector 2019 detects the level transitions of these signals and changes its output from a low to a high state. The high output of the detector 2019 masks the output of the oscillator 2018 at the gate 2511. As the clock pulses generated by the oscillator 2018 are thus prevented from reaching the CLK input of the shift register 2016, the contents of the shift register 2016 are prevented from shifting. Thus the arbitrator 1370 is prevented from passing the right to transmit to another interface module while the one module 1112 is transmitting.

When the interface module 1112 finishes transmitting, the transition detector 2019 ceases to detect signal level transitions and resets its output to a low level. Oscillator 2018 clock signals thus cease to be masked at the gate 2511, and the next oscillator 2018 signal following the resetting of the output of the transition detector 2019 reaches the CLK input of the shift register 2016.

In response to its CLK input, the shift register 2016 shifts its 0001 contents by one to cause its QB output to go high and its QA output to go low. This causes the gate 2012 to become disabled and the gate 2013 to become enabled to allow only transmissions from the interface module 1114 to reach the gate 2010. Also, the change in the QA and QB outputs causes the output of the oscillator 2017 to become unmasked at the gate 2516 and to become masked at the gate 2517. Consequently, "collision detected" signals are sent to the interface module 1112, while they cease being sent to the interface module 1114, and the right to transmit passes from the module 1112 to the module 1114.

Following the module 1114 the interface module 1117, and thereafter the module 1118, is given the chance to transmit, after which the process begins anew with the interface module 1112.

If at any time the remote collision detector 1113 of the transceiver 1111 detects a collision on the bus 1010 and sends a "collision detected" signal on "c"line, the signal is detected by the transition detector 2020 which responds by setting its output high. In response to the high CLR input, the shift register 2016 sets all four of its outputs QA-QD low. This causes all four gates 2012-2015 to become disabled and thus causes "collision detected" signals to be sent to all four interface modules 1112, 1114, 1117, and 1118. When remote collision ceases to be detected, the transition detector 2020 resets the CLR input of the shift register 2016 low, and the shift register 2016 resumes its previously interrupted activity.

If at any time two or more of the shift register outputs QA-QD have a high state, it is an error condition that can lead to the occurrence of a local collision. Such error condition is detected by one or more of the gates 2520-2525. The detecting gates set their output high, causing a high output to appear at the output of the gate 2526 and therefore a high LD input to appear at the shift register 2016. The register 2016 responds by reloading itself with the state of its load inputs A-D, thereby resetting its outputs QA-QD to the 0001 state. In response the LD input drops low, and the interface module 1112 becomes enabled for transmission.

The above-described embodiment of the adapter and local arbitrator 1130, shown in FIG. 4, is very simple to implement and even to retrofit into existing systems. However, an alternative embodiment of the adapter and local arbitrator 1130, shown in FIGS. 7 and 8, improves the efficiency and throughput of the communication network by granting the right to transmit only to those interface modules that have indicated a readiness to transmit.

Accordingly, the interface modules must have means for signaling to the adapter and local arbitrator 1130 that they are ready to transmit, as well as means for receiving from the arbitrator a grant of the right to transmit. Some conventional interface modules possess such capability. Those that do not require a small modification. For example, in the case of interface stages 115 or 116 of Metcalfe et al., the modification may be implemented by interrupting the lead from the Q output of the flip-flop 743 (see FIG. 6 of Metcalfe et al.) as it crosses from the transmitter control 335 to the transmitter shift register 328, leading the Q output of the flip-flop 743 out as a REQUEST line, and leading the other end of the interrupted lead out as a GRANT line, as shown in FIG. 6.

The REQUEST line is connected to the input of a line driver 2601 whose output is connected to an "r" line leading to the transceiver module 1125. The GRANT line is connected to the output of a line receiver 2602 whose input is connected to a "g" line leading from the transceiver module 1125.

Figure 7:
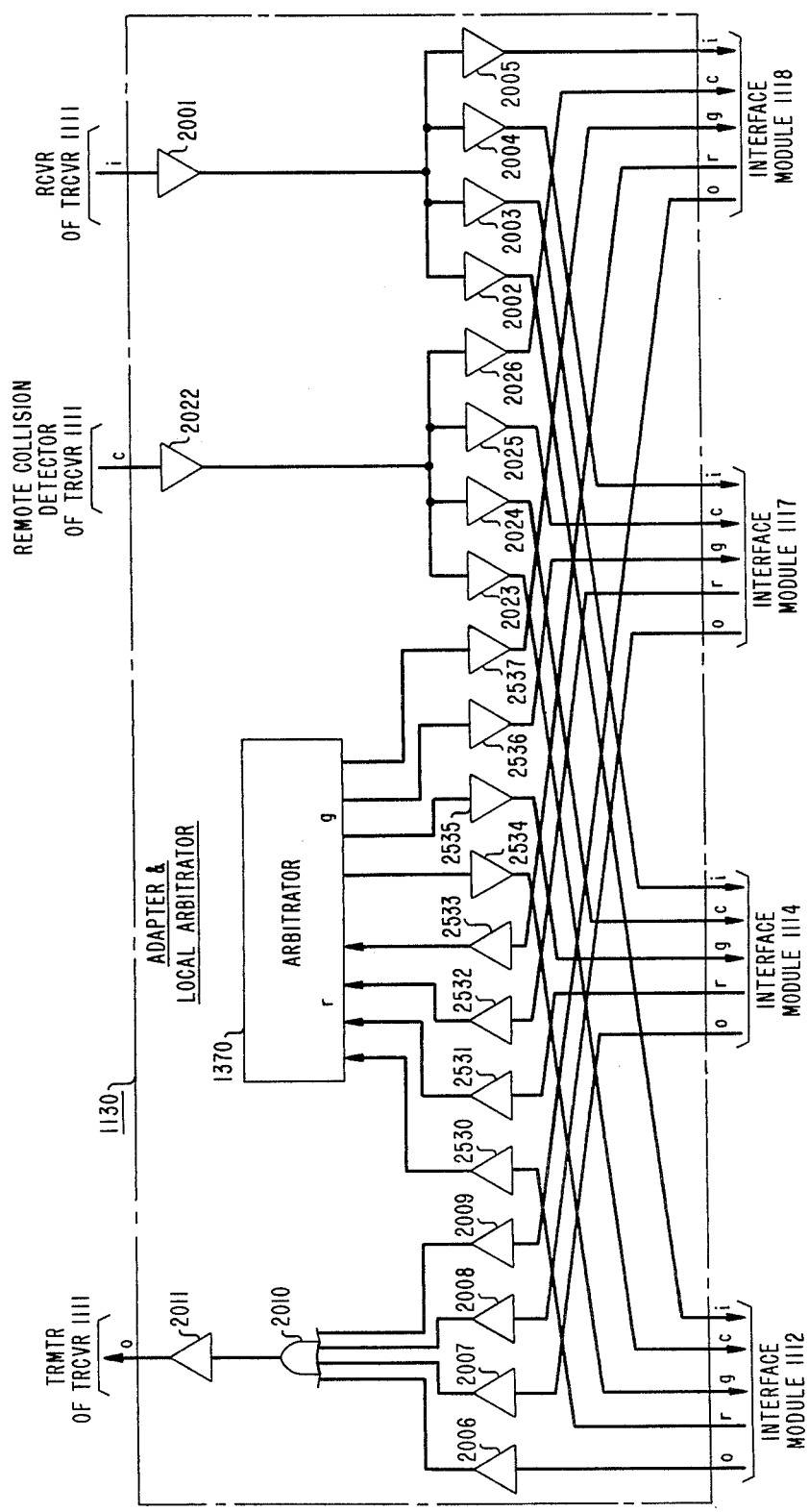
FIG. 7 is a logic diagram of a second embodiment of an adapter and local arbitrator block of FIG. 1.
Figure 8:
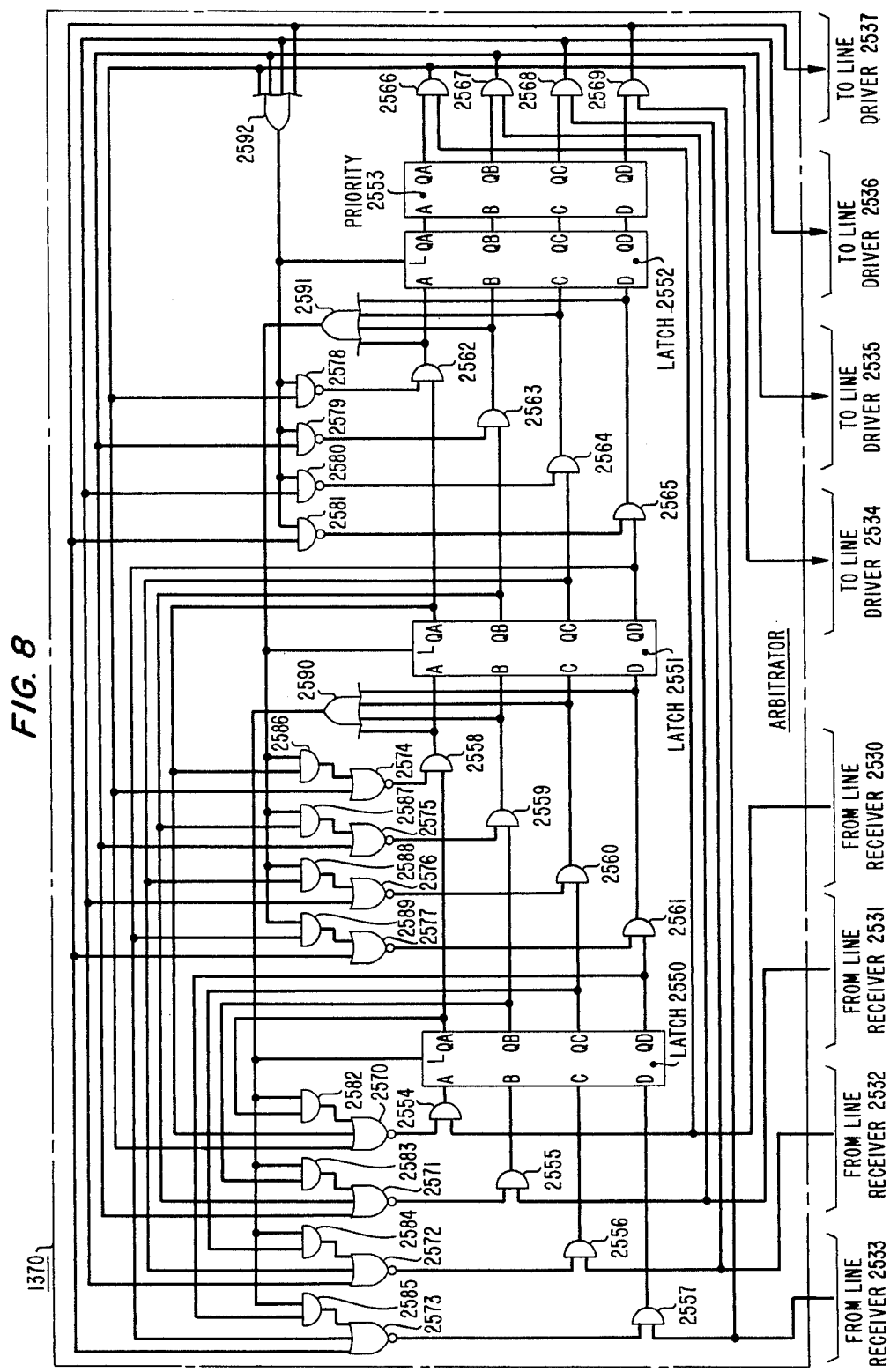
FIG. 8 is a circuit diagram of the local arbitrator of FIG. 7.

Referring now to FIG. 7, the "r" and "g" lines of the interface modules 1112, 1114, 1117, and 1118 are connected to the adpater and local arbitrator 1130, as are their "o", "c", and "i" lines. In many respects, the connections of the latter three lines in FIG. 8 are similar to those of the embodiment of the adapter and local arbitrator of FIG. 4.

The "o" lines from the interface modules 1112, 1114, 1117, and 1118 are connected to the inputs of line receivers 2006-2009, respectively, whose outputs are connected to inputs of an OR gate 2010. The output of the gate 2010 is connected to the input of a line driver 2011, whose output is connected to the "o" line to the transceiver 1111. Thus the transmitter input of the transceiver 1111 is fanned out to outputs of all of the interface modules which are associated with the transceiver 1111.

The "r" lines from the interface modules 1112, 1114, 1117, and 1118 are connected to inputs of line receivers 2530-2533, respectively, whose outputs are connected to inputs of an arbitrator 1370. Outputs of the arbitrator 1370 are connected to the inputs of line drivers 2534-2537 whose outputs are connected to the "g" lines from the interface modules 1112, 1114, 1117, and 1118, respectively. Thus the arbitrator 1370 is adapted to receive REQUEST signals from all interface modules associated with the transceiver 1111 and to send GRANT signals to any of those interface modules.

The "c" line from the transceiver 1111 is connected to the inputs of line drivers 2023-2026, whose outputs are connected to the "c" lines of the interface modules 1112, 1114, 1117, and 1118, respectively. The "i" line from the transceiver 1111 is similarly connected to the "i" lines of those modules, through line drivers 2002-2005, respectively. Thus the collision detector and receiver outputs of the transceiver 1111 are fanned out to the inputs of all of the interface modules which are associated with that transceiver.

The circuit of the arbitrator 1370 of FIG. 7 is shown in the diagram of FIG. 8. The arbitrator 1370 arbitrates contemporaneous requests by the interface modules for transmission rights. It grants the right to transmit to only one of the requesting interface modules at a time. Requests for transmission made while one interface module is in possession of the grant are queued up by the arbitrator 1370 and are processed in the sequence of their reception. Priority between simultaneous requests is resolved according to any suitable scheme. Furthermore, an interface module is not allowed to have more than one request pending and being granted at any one time.

It will be noted that the circuitry of FIG. 8 may be divided into portions each of which is associated with one of the interface modules connected to the arbitrator 1370, and that these portions are substantially duplicative of each other.

The outputs of the line receivers 2530-2533 are connected to the inputs of AND gates 2554-2557, respectively. The outputs of the gates 2554-2557 are connected to A-D inputs, respectively, of a first latch 2550.

QA-QD outputs of the first latch 2550 are connected to inputs of AND gates 2582-2585, respectively, whose outputs form inputs to NOR gates 2570-2573, respectively, whose outputs in turn are connected to second inputs of the AND gates 2554-2557, respectively. The QA-QD outputs of the first latch 2550 are also connected to inputs of AND gates 2558-2561, respectively, whose outputs are connected to A-D inputs of a second latch 2551 and to the four inputs of an OR gate 2590. The output of the gate 2590 is connected to the latch (L) control input of the first latch 2550 and to second inputs of the AND gates 2582-2585 which are associated with the first latch 2550.

QA-QD outputs of the second latch 2551 are connected to inputs of AND gates 2586-2589, respectively, whose outputs form inputs to NOR gates 2574-2577, respectively, whose outputs in turn are connected to second inputs of the AND gates 2558-2561, respectively. The QA-QD outputs of the second latch 2551 also form second inputs to the NOR gates 2570-2573, respectively, associated with the first latch 2550.

The QA-QD outputs of the second latch 2551 are also connected to inputs of AND gates 2562, respectively, whose outputs are connected to A-D inputs of a third latch 2552, and to four inputs of an OR gate 2591. The output of the gate 2591 is connected to the L control input of the second latch 2551, and to second inputs of the AND gates 2586-2589 which are associated with the second latch 2551.

The three latches 2550-2552 are conventional four bit latches, such as the device 74116 of Texas Instruments, Inc. of Dallas, Texas.

Outputs QA-QD of the third latch are connected to inputs A-D, respectively, of a conventional priority resolution circuit 2553. Outputs QA-QD of the priority resolution circuit are connected to first inputs of AND gates 2566-2569, respectively, whose second inputs are connected to the outputs of the line receivers 2530-2533, respectively. The outputs of the AND gates 2566-2569 are connected to (a) inputs of an OR gate 2592 whose output is connected to the L input of the third latch 2552 and to inputs of NAND gates 2578-2581, (b) second inputs of the NAND gates 2578-2581, respectively, whose outputs in turn form second inputs of the AND gates 2562-2565 associated with the third latch 2552, (c) second inputs of the NOR gates 2574-2577, respectively, associated with the second latch 2551, (d) third inputs of the NOR gates 2570-2573, respectively, associated with the first latch 2550, and (e) the inputs of the line drivers 2534-2536, respectively, which drive the "g" lines to the four interface modules 1112, 1114, 1117, and 1118.

As can be seen from the above description of the circuit of FIG. 8, the arbitrator 1370 may be divided into four portions each of which is associated with the "r" and "g" lines of one of the interface modules and each of which is substantially duplicative of the others. Hence the operation of the arbitrator 1370 will be described in relation to one interface module 1112 only, with the understanding that the discussion likewise pertains to the operation of the arbitrator 1370 with respect to the other interface modules 1114, 1117, and 1118.

Assuming that the interface module 1112 is not generating a request to transmit, its REQUEST lead (see FIG. 6) is low, and therefore its "c" line and the output of the line receiver 2530 are likewise low. Also assuming that the interface module 1112 has no previous request queued, or pending, the A inputs and QA outputs of the latches 2550-2552 and of the priority resolution circuit 2553 are low, and hence the "g" line and the GRANT lead (see FIG. 6) of the interface module 1112 are low. As its GRANT lead is low, the interface module 1112 is disabled from transmitting to the transceiver module 1125.

When the necessary conditions for transmission are met and the interface module 1112 is ready to transmit, it sends the REQUEST lead high (see Metcalfe et al). This request signal appears at the output of the line receiver 2530 and therefore at the input of the AND gate 2554. The low QA outputs of the latches 2550 and 2551 and of the priority detector 2553 assure that the output of the NOR gate 2570 is high, and hence the gate 2554 is enabled. The request signal therefore passes through the gate 2554 to the inputs of the latch 2550.

If all of the outputs of the AND gates 2558-2561 are low, the OR gate 2590 has a low output which enables the latch 2550, via the L control input, to receive the signal levels at its inputs A-D and to output these signal levels at its outputs QA-QD. However if the outputs of any one or more of the AND gates 2558-2561 are high, the OR gate 2590 has a high output and the latch 2550 is disabled, prevented from accepting the signal levels present at its inputs A-D.

Thus the latch 2550 holds back a request signal when a preceding request signal is pending before the next latch 2551. As will be seen, the latches 2551 and 2552 act in a similar manner, and together the latches 2550-2552 establish a serial queue of pending request signals which is shifted, moved forward by one, every time the earliest outstanding request is processed to completion.

When the output of the OR gate 2590 is low, the latch 2550 is activated and passes the request signal from its A input to its QA output. This output signal is input to the AND gate 2558.

The low QA output of the latch 2551 and of the priority resolution circuit 2553 assure that the output of the NOR gate 2574 is high, and hence the gate 2558 is enabled. The request signal from the QA output of the latch 2550 therefore passes through the gate 2554 to the input A of the latch 2551 and to an input of the OR gate 2590.

The gate 2590 responds by setting its output high. This causes a high signal to appear at the L input of the latch 2550. The latch 2550 becomes disabled, that is, its outputs QA-QD become latched to their current state and the inputs A-D become disconnected from the outputs.

At this point the latch 2550 is no longer responsive to the output of the line receiver 2530. Having received and "sampled" a request signal, the latch 2550 places the request in the queue of request signals and retains it there even if the request signal ceases to be generated by the interface module 1112.

As was shown above, the QA output of the latch 2550 changed from low to high while the output of the OR gate 259 also changed from low to high. Therefore the output of the AND gate 2582, to which the above two outputs are input, goes high. This causes the output of the NOR gate 2570 to become low, and the gate 2554 becomes disabled, thereby disconnecting the output of the line receiver 2530 from the A input of the latch 2550. The output of the gate 2554 goes low, setting the A input of the latch 2550 low. But because the latch 2550 is disabled, its output QA remains latched high.

Returning now to the latch 2551 which has the request signal at its input A, this latch 2551 is controlled by the output of the OR gate 2591 in the same manner as the latch 2550 is controlled by the output of the OR gate 2590: if the output of the OR gate 2591 is high in response to a preceding request signal pending at one of the inputs A-D of the latch 2552, the latch 2551 is disabled, but if the output of the gate 2591 is low in response to low levels present at all four inputs A-D of the latch 2552, the latch 2551 is enabled. Thus the latch 2591 insures that the request is again placed in a queue behind the immediately preceding request, if one exists.

When the output of the OR gate 2591 is low, latch 2551 is enabled and passes the request signal from its A input and its QA output, from whence the request signal is input to the AND gates 2562 and 2586, and to the NOR gate 2570.

At the NOR gate 2570, the change of the QA output of the latch 2551 from a low to a high state causes no change in the output of the gate 2570, because its input from the AND gate 2582 is alreadly high.

The low QA output of the priority detector 2553 assures that the output of the NAND gate 2578 is high, and hence the gate 2562 is enabled. The request signal therefore passes through the gate 2562 to the A input of the latch 2552 and to an input of the OR gate 2591.

The gate 2591 responds by setting its output high. This causes a high signal to appear at the L input of the latch 2551. The latch 2551 becomes disabled, latching its outputs QA-QD their current state and disconnecting the inputs A-D from those outputs.

While the QA output of the latch 2551 changed from low to high, the output of the OR gate 2591 also changed from low to high. Therefore the output of the AND gate 2586, to which the above two outputs are input, goes high. This causes the output of the NOR gate 2574 to become low, and the gate 2558 becomes disabled, thereby disconnecting the QA output of the latch 2550 from the A input of the latch 2551. The output of the gate 2558 goes low, setting the A input of the latch 2551 low. But because the latch 2551 is disabled, its output QA remains latched high.

If requests from any of the other interface 20 modules 1114, 1117, and 1118 have come to be queued up before the latch 2551, the OR gate 2590 retains its high output, and no further changes take place in the state of the latch 2550 until the queue advances.

However, if no request from any of those interface modules is queued up at the inputs of the latch 2551, the low output of the AND gate 2558 will cause the OR gate 2590 to change its output to low. This brings the L input of the latch 2550 and an input of the AND gate 2582 low. The output of the AND gate 2582 goes low, but as the input to the NOR gate 2570 from the QA output of the latch 2551 is high, the gate 2570 retains its low output. However, in response to its low L input, the latch 2550 changes the state of its output QA-QD to the state of its inputs A-D, respectively. This causes a low level to appear at the output QA of the latch 2550. This low level appears at the inputs of both AND gates 2558 and 2582, both of which gates remain disabled and maintain their low outputs.

Back at the latch 2552, the request signal has been presented to the input A of the latch 2552. Whether or not the latch 2552 immediately accepts the signal is dependent upon the state of the grant lines to the four interface modules as seen at the outputs of the four AND gates 2566-2569. If a grant signal is being generated to any of the four interface modules, the output of the OR gate 2592 is high, the latch 2552 is disabled, and the request signal remains queued at the A input of the latch 2552 until grant signals cease to be generated.

When grant signals cease to be generated, i.e., the outputs of all four of the AND gates 2567 go low, the output of the OR gate 2592 goes low, enabling the latch 2552 and causing it to move the awaiting request signal from its input A to its output QA, from where the request signal passes to the A input of the priority resolution circuit 2553.

The priority resolution circuit 2553 assures that, if by some change request signals arrived simultaneously at more than one input of the latch 2550 and henced progressed through the queue of latches 2550-2552 in parallel as opposed to in series to simultaneously arrive at more than one output of the latch 2552, the result will not be a contemporaneous grant to two or more interface modules of the right to transmit.

The priority resolution circuit may be any circuit which selects only one of a plurality of simultaneous inputs for output. Circuitry of this nature is conventional.

If a high signal level appears at only one of the A-D inputs of the priority resolution circuit 2553, the circuit 2553 merely passes the signal out onto the corresponding of the outputs QA-QD. If a high level signal appears at more than one of its A-D inputs, the circuit 2553 blocks all but one of those inputs, and passes the selected input signal to the corresponding output.

Assuming that the A input signal is either the lone, or the selected, high input signal, it passes from the A input to the QA output of the priority resolution circuit 2553 and therefrom to an input of the AND gate 2566.

The second input of the gate 2566 is connected to the output of the line receiver 2593 and thus it monitors the continuing presence of the request signal from the interface module 1112.

If the request signal is still present, the gate 2566 outputs a high signal to the input of the line driver 2534 (see FIG. 7). The line driver 2534 in turn outputs a high signal on the "g" line to the interface module 1112 to advise it that the arbitrator 1370 has granted it the right to transmit. The GRANT lead of the interface stage 1115 of the module 1112 goes high, and the module 1112 becomes enabled for transmission.

If the request signal is no longer present, having been removed by the interface module 1112 for example in response to the detection of a remote collision (see Metcalfe et al.), the arbitrator 1370 waits until the interface module 1112 reasserts the request, at which time the gate 2566 proceeds to output a high signal to grant the interface module 1112 the right to transmit.

The high output of the AND gate 2566 has no effect on the output state of the NOR gate 2570, as at least one of its inputs, from the QA output of the latch 2551, is already high. Neither does it affect the output state of the NOR gate 2574, whose input from the AND gate 2586 is already high.

However, the appearance of a high level output at the gate 2566 causes the output of the OR gate 2592 to go high. The resulting high L input of the latch 2550 causes that latch to become disabled, latching outputs QA-QD to their current state and disconnecting the inputs A-D from the outputs.

As the output of the AND gate 2566 changes from low to high, the output of the OR gate 2592 also changes from low to high. Therefore the output of the NAND gate 2578, to which the above two outputs are input, goes low. This causes the gate 2562 to become disabled, thereby disconnecting the QA output of the latch 2551 from the A input of the latch 2552. The output of the gate 2562 goes low, setting the A input of the latch 2552 low. But because the latch 2552 is disabled, its output QA remains latched high.

If requests from any of the other interface modules 1114, 1117, and 1118 have come to be queued up before the latch 2552, the OR gate 2591 retains its high output, and no further changes take place in the states of the arbitrator 1370 until the grant ceases to be given to the interface module 1112, i.e., the output of the AND gate 2566 goes low.

However, if no request from any of those interface modules is queued up at the inputs of the latch 2552, the low output of the AND gate 2562 will cause the OR gate 2591 to change its output to low. This brings the L input of the latch 2551 and an input of the AND gate 2586 low. The output of the AND gate 2586 goes low, but as the input to the NOR gate 2574 from the output of the AND gate 2566 is high, the gate 2570 retains its low output. However, in response to its low L input, the latch 2551 changes the state of its outputs QA-QD to the state of its inputs A-D, respectively. This causes a low level to appear at the output QA of the latch 2551. This low level appears at the inputs of both AND gates 2562 and 2586, both of which gates remain disabled and maintain their low outputs. The low QA output level of the latch 2551 also appears at an input of the NOR gate 2570, which also retains its low output, because of the high input from the AND gate 2566.

Returning now to the grant signal being generated at the gate 2566, when the interface module 1112 is done transmitting, or conditions conducive to a successful transmission cease to exist, the module 1112 ceases to generate the request signal (see Metcalfe et al.). As a result, the output of the line receiver 2593 goes low, bringing low inputs of the AND gates 2554 and 2566. This causes the output of the gate 2566 to drop low and the grant signal to the interface module 1112 ceases to be generated.

As the output of the gate 2566 goes low, the output of the OR gate 2592 goes low, the L input of the latch 2552 goes low, thereby enabling the latch 2552, and the latch 2552 changes the state of its outputs QA-QD to the state of its inputs A-D, respectively. This causes a low level to appear at the output QA of the latch 2552 and hence at the output of the priority resolution circuit 2553. It also enables the granting of any request that immediately followed the just-completed request in the queue of requests.

The low output level of the gate 2566 also appears at inputs of the NAND gate 2578 and of the NOR gates 2574 and 2570, causing their outputs to go high and thereby enabling the AND gates 2562, 2558, and 2554, respectively. The arbitrator 1370 thus reassumes its initially-assumed condition with respect to the receive and grant signals of the interface module 1112, and enables the queuing up of a new request from the interface module 1112.

Of course, it should be understood that various changes and modifications to the illustrative embodiment described above will be apparent to those skilled in the art. For example, other remote collision detection schemes than the bit-by-bit comparison of transmitted and received signal disclosed by Metcalfe et al. may be utilized within the system. Or the communication medium may be for example comprised of optical fibers, not coaxial cable. Any desired arbitration scheme may be utilized for preventing local collisions, not just the two illustrated herein. And the system may be provided with other optional features, such as a sanity timer to limit the duration of a transmit grant. These and other changes and modifications can be made without departing from the spirit and the scope of the invention and without diminishing its attendant advantages. It is therefore intended that all such changes and modifications be covered by the following claims.

What is claimed is:

1. An improved data communication system comprising:
   a communication medium;
   a plurality of transceiver means connected to the medium for communicating across the medium;
   remote collision detection means associated with each transceiver means for detecting collisions between a plurality of communications at least one of which involves the associated transceiver means;
   means associated with at least one transceiver means for adapting the transceiver means for concurrent interfacing for communication with a plurality of using means responsive to the associated remote collision detection means by refraining from commencing to transmit communications to the associated transceiver means while the associated remote collision detection means are detecting collision; and
   means associated with each of the at least one transceiver means for preventing local collisions.

2. The apparatus of claim 1 wherein the local collision preventing means comprise means for preventing contemporaneous communications from a plurality of the using means to the transceiver means.

3. The apparatus of claim 1 wherein the local collision preventing means comprise means for arbitrating communications access from the plurality of the using means to the transceiver means.

4. An improved data communication system comprising:
   a communication medium;
   a plurality of transceiver means connected to the medium for communicating across the medium;
   remote collision detection means associated with each transceiver means for detecting collisions between a plurality of communications at least one of which involves the associated transceiver means;
   a plurality of means connected to the plurality of transceiver means for interfacing using means to the transceiver means for communication;
   means associated with at least one transceiver means for adapting the transceiver means for concurrent connection to a plurality of interface means; and
   means associated with each of the at least one transceiver means for preventing local collisions.

5. The apparatus of claim 4 wherein the local collision preventing means comprise means for preventing contemporaneous communications from a plurality of the interface means to the transceiver means.

6. The apparatus of claim 4 wherein the local collision preventing means comprise means for arbitrating communications access from the plurality of the interface means to the transceiver means.

7. The apparatus of claim 4 wherein the local collision preventing means comprises:
  means for detecting readiness to communicate by at least one interface means connected to the transceiver means;
  means for selecting one of the ready interface means; and
  means for enabling communications from only the selected one of the interface means.

8. The apparatus of claim 7 wherein each of the interface means include means for signaling a request to communicate and means for receiving a grant to communicate, wherein the detecting means include means for monitoring the request signaling means for requests, and wherein the enabling means include means for signaling a grant to the selected one of the interface means.

9. The apparatus claim 4 wherein the local collision preventing means comprise:
  means for selecting one of the interface means connected to the transceiver means; and
  means for disabling communications from all but the selected one of the interface means.

10. The apparatus of claim 9 wherein the disabling means include means for signaling continuous detection of collision to all but the selected one of the interface means.

11. An improved data communication system comprising:
  (a) a communication medium;
  (b) a plurality of transceiver means connected to the medium for communicating across the medium, at least one transceiver means having transmitter input means and receiver output means;
  (c) remote collision detection means associated with each transceiver means for detecting collisions between a plurality of communications at least one of which involves the associated transceiver means, the collision detection means associated with the at least one transceiver means having a remote collision detect output means;
  (d) a plurality of means connected to the plurality of transceiver means for interfacing using means to the transceiver means for communication, at least some of the interfacing means having receiver interface input means, transmitter interface output means, collision backoff control input means, transmission request output means, and transmission grant input means;
  (e) means associated with the at least one transceiver means for adapting the transceiver means and associated remote collision detection means for concurrent connection to a plurality of interface means, the adapting means comprising
    (1) means for fanning out the transmitter input means to a plurality of the transmitter interface output means,
    (2) means for fanning out the receiver output means to a plurality of the receiver interface input means, and
    (3) means for fanning out the remote collision detect output means to a plurality of the collision backoff control input means; and
  (f) means associated with each of the at least one transceiver means for preventing local collisions comprising
    (1) means for monitoring the transmission request output means of the interface means connected to the transceiver means for requests,
    (2) means for selecting one from a plurality of substantially contemporaneous requests, and
    (3) means for signaling a grant to the transmission grant input means of the interface means whose request has been selected.

12. An improved data communication system comprising:
  (a) a communication medium;
  (b) a plurality of transceiver means connected to the medium for communicating across the medium, at least one transceiver means having transmitter input means and receiver output means;
  (c) remote collision detection means associated with each transceiver means for detecting collisions between a plurality of communications at least one of which involves the associated transceiver means, the collision detection means associated with the at least one transceiver means having a remote collision detect output means;
  (d) a plurality of means connected to the plurality of transceiver means for interfacing using means to the transceiver means for communication, at least some of the interfacing means having receiver interface input means, transmitter interface output means, and collision backoff control input means;
  (e) means associated with the at least one transceiver means for adapting the transceiver means and associated remote collision detection means for concurrent connection to a plurality of interface means, the adapting means comprising
    (1) means for fanning out the transmitter input means to a plurality of the transmitter interface output means,
    (2) means for fanning out the receiver output means to a plurality of the receiver interface input means, and
    (3) means for fanning out the remote collision detect output means to a plurality of the collision backoff control input means; and
  (f) means associated with each of the at least one transceiver means for preventing local collisions comprising
    (1) means for selecting one of the interface means connected to the transceiver means, and
    (2) means for continuously inputing collision detected signals to the collision backoff control input means of all but the selected one of the interface means.

13. An improved transceiver for a data communication system which includes a communication medium, a plurality of transceiver means connected to the medium for communicating across the medium, and remote collision detection means associated with each transceiver means for detecting collisions between a plurality of communications at least one of which involves the associated transceiver means, the transceiver including the associated remote collision detection means, the transceiver comprising:
  means for adapting the transceiver for concurrent interfacing for communications with a plurality of using means responsive to the associated remote collision detection means by refraining from commencing to transmit communications to the transceiver means while the associated remote collision detection means are detecting collision; and
  means for preventing local collisions.

14. The apparatus of claim 13 wherein the local collision preventing means comprise means for preventing contemporaneous communications from a plurality of the using means to the transceiver.

15. The apparatus of claim 13 wherein the local collision preventing means comprise means for arbitrating communications access from the plurality of the using means to the transceiver.

16. An improved transceiver for a data communication system which includes a communication medium, a plurality of transceiver means connected to the medium for communicating across the medium, remote collision detection means associated with each transceiver means for detecting collisions between a plurality of communications at least one of which involves the associated transceiver means, and a plurality of means connected to the transceiver means for interfacing using means and transceiver means for communication, the transceiver including the associated remote collision detection means, the transceiver comprising:

means for adapting the transceiver for concurrent connection to a plurality of the interface means; and means for preventing local collisions.

17. The apparatus of claim 16 wherein the local collision preventing means comprise means for preventing contemporaneous communications from a plurality of the interface means to the transceiver.

18. The apparatus of claim 16 wherein the local collision preventing means comprise means for arbitrating communications access from the plurality of the interface means to the transceiver.

19. The apparatus of claim 16 wherein the local collision preventing means comprise:

means for detecting readiness to communicate of at least one interface means connected to the transceiver;

means for selecting one of the ready interface means; and means for enabling communications from only the selected one of the interface means.

20. The apparatus of claim 19 wherein each of the interface means include means for signaling a request to communicate and means for receiving a grant to communicate, wherein the detecting means include means for monitoring the request signaling means for requests, and wherein the enabling means include means for signaling a grant to the selected one of the interface means.

21. The apparatus of claim 16 wherein the local collision preventing means comprise:

means for selecting one of the interface means connected to the transceiver; and means for disabling communications from all but the selected one of the interface means.

22. The apparatus of claim 21 wherein the disabling means include means for signaling continuous detection of collision to all but the selected one of the interface means.

23. An improved transceiver for a data communication system which includes a communication medium, a plurality of transceiver means connected to the medium for communicating across the medium, remote collision detection means associated with each transceiver means for detecting collisions between a plurality of communications at least one of which involves the associated transceiver means, and a plurality of means connected to the plurality of transceiver means for interfacing using means to the transceiver means for communication, at least some of the interfacing means having a receiver interface input means, transmitter interface output means, collision backoff control input means, transmission request output means, and transmission grant input means, the transceiver including the associated remote collision detection means and having transmitter input means, receiver input means, and remote collision detect output means, the transceiver comprising:

(a) means for adapting the transceiver for concurrent connection to a plurality of interface means, comprising (1) means for fanning out the transmitter input means to a plurality of transmitter interface output means, (2) means for fanning out the receiver output means to a plurality of receiver interface input means, (3) means for fanning out the remote collision detect output means to a plurality of collision backoff control input means; and (b) means for preventing local collisions comprising (1) means for monitoring the transmission request output means of the interface means connected to the transceiver for requests, (2) means for selecting one from a plurality of substantially contemporaneous requests, and (3) means for signaling a grant to the transmission grant input means of the interface means whose request has been selected.

24. An improved transceiver for a data communication system which includes a communication medium, a plurality of transceiver means connected to the medium for communicating across the medium, remote collision detection means associated with each transceiver means for detecting collisions between a plurality of communications at least one of which involves the associated transceiver means, and a plurality of means connected to the plurality of transceiver means for interfacing using means to the transceiver means for communication, at least some of the interfacing means having a receiver interface input means, transmitter interface output means, and collision backoff control input means, the transceiver including the associated remote collision detection means and having transmitter input means, receiver input means, and remote collision detect output means, the transceiver comprising:

(a) means for adapting the transceiver for concurrent connection to a plurality of interface means, comprising (1) means for fanning out the transmitter input means to a plurality of the transmitter interface output means, (2) means for fanning out the receiver output means to a plurality of the receiver interface input means, and (3) means for fanning out the medium collision detect output means to a plurality of the collision backoff control input means; and (f) means associated with each of the at least one transceiver means for preventing local collisions comprising (1) means for selecting one of the interface means connected to the transceiver means, and (2) means for continuously inputing collision detected signals to the collision backoff control input means of all but the selected one of the interface means.

25. An adapter and local collision detector for a data communication system which includes a communication medium, a plurality of transceiver means connected to the medium for communicating across the medium, and remote collision detection means associated with each transceiver means for detecting collisions between a plurality of communications at least one of which involves the associated transceiver means, the adapter and local arbitrator comprising;

means for adapting transceiver means and associated remote collision detection means for concurrent interfacing for communications with a plurality of using means responsive to the remote collision detection means by refraining from commencing to transmit communications to the transceiver means while the remote collision detection means are detecting collision; and means for preventing local collisions.

26. The apparatus of claim 25 wherein the local collision preventing means comprise means for preventing contemporaneous communications from a plurality of the using means to the transceiver means.

27. The apparatus of claim 25 wherein the local collision preventing means comprise means for arbitrating communications access from the plurality of the using means to the transceiver means.

28. An adapter and local collision detector for a data communication system which includes a communication medium, a plurality of transceiver means connected to the medium for communicating across the medium, remote collision detection means associated with each transceiver means for detecting collisions between a plurality of communications at least one of which involves the associated transceiver means, and a plurality of means connected to the transceiver means for interfacing using means and transceiver means for communication, the adapter and local collision detector comprising:

means for adapting transceiver mens and associated remote collision detection means for concurrent connection to a plurality of interface means; and means for preventing local collisions.

29. The apparatus of claim 28 wherein the local collision preventing means comprise means for preventing contemporaneous communications from a plurality of the interface means to the transceiver means.

30. The apparatus of claim 28 wherein the local collision preventing means comprise means for arbitrating communications access from the plurality of the interface means to the transceiver means.

31. The apparatus of claim 28 wherein the local collision preventing means comprise:

means for detecting readiness to communicate of at least one interface means connected to the transceiver means;

means for selecting one of the ready interface means; and means for enabling communications from only the selected one of the interface means.

32. The apparatus of claim 31 wherein each of the interface means include means for signaling a request to communicate and means for receiving a grant to communicate, wherein the detecting means include means for monitoring the request signaling means for requests, and wherein the enabling means include means for signaling a grant to the selected one of the interface means.

33. The apparatus of claim 28 wherein the local collision preventing means comprise:

means for selecting one of the interface means connected to the transceiver means; and means for disabling communications from all but the selected one of the interface means.

34. The apparatus of claim 33 wherein the disabling means include means for signaling continuous detection of collision to all but the selected one of the interface means.

35. An adapter and local arbitrator for a data communication system which includes a communication medium, a plurality of transceiver means connected to the medium for communicating across the medium, at least one transceiver means having a transmitter input means and a receiver output means, remote collision detection means associated with each transceiver means for detecting collisions between a plurality of communications at least one of which involves the associated transceiver means, the remote collision detection means associated with the at least one transceiver means having a remote collision detect output means, and a plurality of means connected to the plurality of transceiver means for interfacing using means to the transceiver means for communication, at least some of the interface means having receiver interface input means, transmitter interface output means, collision backoff control input means, transmission request output means, and transmission grant input means, the adapter and local collision detector comprising:

(a) means for fanning out the transmitter input means to a plurality of the transmitter interface output means;

(b) means for fanning out the receiver output means to a plurality of the receiver interface input means;

(c) means for fanning out the remote collision detect output means to a plurality of the collision backoff control input means;

(d) means for monitoring the transmission request output means of the interface means connected to the transceiver means for requests;

(e) means for selecting one from a plurality of substantially contemporaneous requests; and (f) means for signaling a grant to the transmission grant input means of the interface means whose request has been selected.

36. An adapter and local arbitrator for a data communication system which includes a communication medium, a plurality of transceiver means connected to the medium for communicating across the medium, at least one transceiver means having a transmitter input means and a receiver output means, remote collision detection means associated with each transceiver means for detecting collisions between a plurality of communications at least one of which involves the associated transceiver means, the remote collision detection means associated with the at least one transceiver means having a remote collision detect output means, and a plurality of means connected to the plurality of transceiver means for interfacing using means to the transceiver means for communication, at least some of the interface means having receiver interface input means, transmitter interface output means, collision backoff control input means, transmission request output means, and transmission grant input means, the adapter and local collision detector comprising:

(a) means for fanning out the transmitter input means to a plurality of the transmitter interface output means;

(b) means for fanning out the receiver output means to a plurality of the receiver interface input means;

(c) means for fanning out the remote collision detect output means to a plurality of the collision backoff control input means;

(d) means for selecting one of the interface means connected to the transceiver means; and (e) means for continuously inputting collision detected signals to the collision backoff control input means of all but the selected one of the interface means.

* * * * *

UNITED STATES PATENT AND TRADEMARK OFFICE
CERTIFICATE OF CORRECTION

PATENT NO. : 4,472,712
DATED : September 18, 1984
INVENTOR(S) : Cyrus F. Ault and Kristin F. Kocan It is certified that error appears in the above-identified patent and that said Letters Patent is hereby corrected as shown below:

```
Column 2, line 56, after "to" add --a--,
Column 6, line 65, after "is" "not" should be --no--,
Column 7, line 28, after "which" "is" should be --it--,
Column 9, line 25, "input" first occurrence should
   be --outputs--,
Column 15, line 21, after "is" "alreadly" should
   be --already--,
Column 15, line 57, after "its" "output" should
   be --outputs--,
Column 16, line 13, after "some" "change" should
   be --chance--.

In the claims, Column 23, claim 28, line 34, after
   "transceiver" "mens" should be --means--.

In the Attorney, Agent, or Firm, "D. Volejnick" should
   be --D. Volejnicek--.
```

Signed and Sealed this

Twelfth Day of March 1985

[SEAL]

Attest:

DONALD J. QUIGG

Attesting Officer     Acting Commissioner of Patents and Trademarks